United States Patent [19]

Wurmbauer et al.

[11] Patent Number: 5,401,484
[45] Date of Patent: Mar. 28, 1995

[54] PROCESS FOR PRODUCING METAL HYDROXIDES WITH A SMALL SPECIFIC AREA

[75] Inventors: Dieter Wurmbauer, Mödling; Heinz Krivanec, Vienna, both of Austria

[73] Assignee: Chemson Polymer-Additive Gesellschaft m.b.H., Laxenburg, Austria

[21] Appl. No.: 971,979

[22] PCT Filed: Jul. 29, 1991

[86] PCT No.: PCT/EP91/01422

§ 371 Date: Apr. 16, 1993

§ 102(e) Date: Apr. 16, 1993

[87] PCT Pub. No.: WO92/03375

PCT Pub. Date: Mar. 5, 1992

[30] Foreign Application Priority Data

Aug. 18, 1990 [DE] Germany .................. 40 26 246.4

[51] Int. Cl.⁶ .................. C01B 13/14; C01F 5/14
[52] U.S. Cl. .................. 423/592; 423/636
[58] Field of Search .................. 423/592, 636

[56] References Cited

U.S. PATENT DOCUMENTS

| 3,044,857 | 7/1962 | Sable | 423/640 |
| 3,676,079 | 7/1972 | Morgan | 423/636 |
| 4,698,379 | 10/1987 | Nakaya et al. | 423/636 |

FOREIGN PATENT DOCUMENTS

| 300851 | 1/1989 | European Pat. Off. | 423/592 |
| 370728 | 5/1990 | European Pat. Off. | 423/636 |
| 57226 | 5/1969 | Poland | 423/636 |
| 1173676 | 12/1969 | United Kingdom | 423/636 |

OTHER PUBLICATIONS

International Publication No. WO92/05113, published Apr. 2, 1992.

Primary Examiner—Wayne Langel
Attorney, Agent, or Firm—John F. A. Earley; John F. A. Earley, III

[57] ABSTRACT

The invention concerns a process for producing metal hydroxides with a small specific area in which the metal hydroxide is produced by hydrating a corresponding metal oxide and then treating it under pressure in an autoclave.

17 Claims, No Drawings

PROCESS FOR PRODUCING METAL HYDROXIDES WITH A SMALL SPECIFIC AREA

The present invention pertains to a process for preparing metal hydroxides of low specific surface.

Both the state of the art and the present invention will be described in greater detail below on the basis of magnesium hydroxide. However, this description is intended only as an example. The present invention is also applicable to other metal hydroxides, such as calcium hydroxide, even though magnesium hydroxide is particularly preferred.

It has been known, for example, that various fillers are added during the preparation of paper, plastics, or rubber, in order to improve, e.g., the mechanical properties, especially the strength and the modulus of elasticity. Mainly metal hydroxides, such as aluminum hydroxide or magnesium hydroxide, are used during the preparation of plastics, especially during the preparation of halogen-free, flame-retarded plastics.

For example, recently plastics for cable sheathing contain magnesium hydroxide as a filler. Since the viscosity of the polymer melt is strongly affected by the specific surface of the filler (larger specific surfaces leading to higher viscosity values), one seeks to keep the specific surface of the filler as small as possible in order not to adversely affect the processability by the addition of the filler.

Consequently, the goal of the present invention is to provide a process for preparing metal hydroxides of the smallest specific surface possible. The smallest specific surface possible is defined as the surface that is preferably smaller than that obtained during the processing of a metal hydroxide according to comparable simple processes.

For example, magnesium hydroxide, which is obtained by precipitation from sea water by adding milk of lime or burned dolomite, has a specific surface of about 40 m$^2$/g (measured according to the BET method), and is consequently unsuitable for use as a filler for plastics.

The precipitation of magnesium hydroxide from natural or artificial solutions (e.g., brines as generated in the potash industry) also leads to precipitated hydroxides with excessively large specific surface.

It has also been known that magnesium hydroxide can be precipitated from aqueous solutions of magnesium salts by adding substoichiometric amounts of a precipitant, e.g., sodium hydroxide, and the basic salt obtained therefrom, which has the general formula $Mg(OH)_x(A)_y \cdot zH_2O$ (in which A is an anion, e.g., $Cl^-$, $SO_4^{2-}$, $NO_3^-$), can be separated and be subjected to an aftertreatment in an autoclave, while the basic salts will split and a magnesium hydroxide will be formed, which can have a specific surface of less than ca. 15 m$^2$/g. Even though the resulting product has a relatively small specific surface, the process is complicated and also has the disadvantage that wastewaters with high salt content must be disposed of.

The present invention is based on the surprising discovery that a metal hydroxide of small specific surface can be obtained in a simple process by using a metal oxide as the starting compound and first hydrating it into metal hydroxide by adding water and subsequently treating it in an autoclave under pressure until the desired specific surfaces below 20 m$^2$/g and especially below 10 m$^2$/g are reached.

This process makes it possible to use as the starting compound a conventional metal oxide, e.g., caustic burned magnesium oxide or a magnesium oxide as is obtained during the thermal decomposition of magnesium chloride in a spray roasting plant.

Contrary to the above-mentioned prior-art precipitation process, there is no precipitation reaction, and no extraneous substances are added (with the exception of water).

Only the magnesium hydroxide prepared beforehand is treated under pressure at elevated temperature, without other manipulations and additives, even during the subsequent autoclave treatment. It was surprisingly found that the said autoclave treatment alone is sufficient for markedly reducing the specific surface of the metal hydroxide to values even below 10 m$^2$/g depending on the autoclave temperature, the pressure and the residence time.

The material can subsequently be directly removed from the autoclave, and after drying it can be used as, e.g., a halogen-free, flame-retardant filler for plastics.

In its most general embodiment, the present invention is characterized by the characteristics of claim 1. The characteristics of the subclaims as well as the other application documents describe advantageous embodiments.

It is advantageous in terms of the goal of the present invention to charge the metal hydroxide as an aqueous suspension into the autoclave. The suspension should have a solids content (metal hydroxide content) between 10 and 70 wt. % and preferably between 30 and 50 wt. %.

The solid particles in the suspension are transformed into particles of smaller specific surface in the autoclave.

It was also found to be particularly advantageous to carry out the hydration of the metal oxide into metal hydroxide by using deionized water. This leads to an increase in the purity of the material.

It is particularly advantageous to ensure that the temperature of the suspension will not rise above 50° C. to 60° C. The increase in temperature is a consequence of the hydration reaction. In the simplest case, the temperature is monitored for this purpose, and cold, deionized water is added when necessary.

Homogeneous mixing of the suspension during the hydration reaction is favorable for the formation of optimal hydroxide crystals.

Depending on the field of application for which the metal hydroxide is intended, the hydrated material can again be washed and/or ground prior to the autoclave treatment, in which case the material should be ground to particle sizes smaller than 5 microns.

The autoclave treatment itself is preferably carried out in the temperature range of 100°–200° C. The saturated vapor pressure is about 6 bar at a temperature of, e.g., 160° C.

Depending on the temperature selected and the pressure that becomes established accordingly, the present invention suggests a residence time between 2 and 24 hours and preferably 8 to 12 hours in the autoclave.

The suspension is heated to the intended temperature by supplying the heat that is released during the condensation of the water vapor on the colder surfaces of the suspension, and especially of the solid particles.

Particularly uniform heat transfer is promoted by circulating the suspension during the autoclave treatment. This also leads to an overall reduction of the residence times.

The autoclave treatment is carried out specifically as a function of the desired resulting specific surface of the metal hydroxide. This can be determined empirically.

The material is removed and dried after the autoclave treatment. The drying is carried out in, e.g., a prior-art spray drier.

The process according to the present invention can be carried out in a simple manner; it eliminates any environmental pollution, and leads to metal hydroxides with specific surfaces that are sometimes below 10 $m^2/g$. Thus, it is far superior to the processes known from the state of the art.

The present invention will be explained in greater detail below on the basis of two exemplary embodiments.

Example 1

One kg caustic MgO was stirred into 5 L deionized water. The temperature of the suspension formed was measured continuously. If the temperature of the suspension threatened to rise above 50° C., more cold water was added.

The mixture was agitated for some time, and then filtered. The filter cake formed was subsequently mixed with more deionized water to prepare a suspension containing 30 wt. % solids, and was ground in a ball mill until the mean particle diameter $d_{50}$ reached 2.5 microns.

After the ground suspension was removed from the grinding bodies, the sample was divided into equal portions.

The first portion was subsequently treated in an autoclave charged with live steam for 12 hours under a pressure of 6.5 bar at a temperature of about 160° C. After removal from the autoclave, the suspension was dried in a spray drier.

The other portion was spray-dried directly, without autoclave treatment.

The following specific surfaces, measured according to the BET method, were then obtained for the two samples:

Sample 1 (with autoclave treatment): 9.8 $m^2/g$
Sample 2 (without autoclave treatment): 21.4 $m^2/g$.

Example 2

Twenty kg of a caustic MgO from a spray roasting plant were stirred into 50 L deionized water. More deionized water was subsequently added until the total volume of the suspension reached 90 L. This [suspension] was subsequently stirred for 24 hours, then filtered off, and the filter cake was again made into a suspension with 50 wt. % solids content with deionized water.

Half of the suspension was subsequently charged into an autoclave. The autoclave was subsequently charged with live steam, while the temperature was set at 180° C. The suspension was then subjected to an 8-hour pressure treatment. The sample removed was subsequently dried in a spray-drier analogously to Example 1.

The remaining reference sample was again charged directly into the spray-drier, without autoclave treatment.

The following values were obtained for the specific surfaces of the two samples:

Sample 1 (pressure-treated sample): 8.9 $m^2/g$
Sample 2 (without pressure treatment): 17 $m^2/g$.

The examples show that the autoclave treatment leads to at least 50% reduction of the specific surface.

We claim:

1. Process for preparing metal hydroxides of small specific surface, wherein a metal hydroxide is first formed by hydrating the corresponding metal oxide in the presence of water but under exclusion of an autoclave treatment, and the metal hydroxide is subsequently treated under pressure in an autoclave at temperatures between 100° C. and 200° C. until a specific surface of less than 20 $m^2/g$ is obtained.

2. Process in accordance with claim 1, wherein the metal hydroxide is charged into the autoclave in the form of an aqueous suspension.

3. Process in accordance with claim 2, wherein a suspension with a solids content between 10 and 70 wt. % is charged into the autoclave.

4. Process in accordance with claim 2, wherein a suspension with a solids content between 30 and 50 wt. % is charged into the autoclave.

5. Process in accordance with claim 1, wherein the hydration of the metal oxide into the metal hydroxide is carried out by using deionized water.

6. Process in accordance with claim 1, wherein the step of hydration of the metal oxide into the metal hydroxide is carried out at a temperature of less than 60° C.

7. Process in accordance with claim 1, wherein the metal hydroxide first formed by hydrating the corresponding metal oxide is washed and/or ground prior to the autoclave treatment.

8. Process in accordance with claim 7, wherein the metal hydroxide first formed by hydrating the corresponding metal oxide is ground to a particle size below 5 microns prior to the autoclave treatment.

9. Process in accordance with claim 7, wherein the metal hydroxide first formed by hydrating the corresponding metal oxide is ground to a fineness $d_{50}$ between 1 and 4 microns.

10. Process in accordance with claim 1, wherein the autoclave treatment is carried out by using live steam.

11. Process in accordance with claim 1, wherein the autoclave treatment is carried out at temperatures between 140° C. and 180° C.

12. Process in accordance with claim 1, wherein the autoclave treatment is carried out over a period of 2 to 24 hours.

13. Process in accordance with claim 1, wherein the suspension is circulated in the autoclave.

14. Process in accordance with claim 1, wherein the material removed from the autoclave is subsequently dried.

15. Process in accordance with claim 14, wherein the material is spray-dried.

16. Process in accordance with claim 1, wherein magnesium oxide is used as the metal oxide.

17. Process for preparing magnesium hydroxide of small specific surface, wherein magnesium hydroxide is first formed by hydrating magnesium oxide in the presence of water but under exclusion of an autoclave treatment, and the magnesium hydroxide is subsequently treated under pressure in an autoclave until a specific surface of less than 10 $m^2/g$ is obtained, wherein the magnesium hydroxide is charged into the autoclave in the form of an aqueous suspension,
wherein a suspension with a solids content between 30 and 50 wt % is charged into the autoclave, wherein the hydration of the magnesium oxide into the magnesium hydroxide is carried out by using deionized water, wherein the step of hydration of the magnesium oxide into the magnesium hydroxide is carried out at a temperature of less than 60° C., wherein the magnesium hydroxide first formed by hydrating the magnesium oxide is washed and/or ground prior to the autoclave treatment, wherein the magnesium hydroxide formed first formed by hydrating the magnesium oxide is ground to a fineness $d_{50}$ between 1 and 4 microns, wherein the autoclave treatment is carried out by using live steam, wherein the autoclave treatment is carried out at temperatures between 140° C. and 180° C., wherein the autoclave treatment is carried out over a period of 2 to 24 hours, wherein the suspension is circulated in the autoclave, and wherein the material removed from the autoclave is subsequently spray-dried.

* * * * *